UNITED STATES PATENT OFFICE.

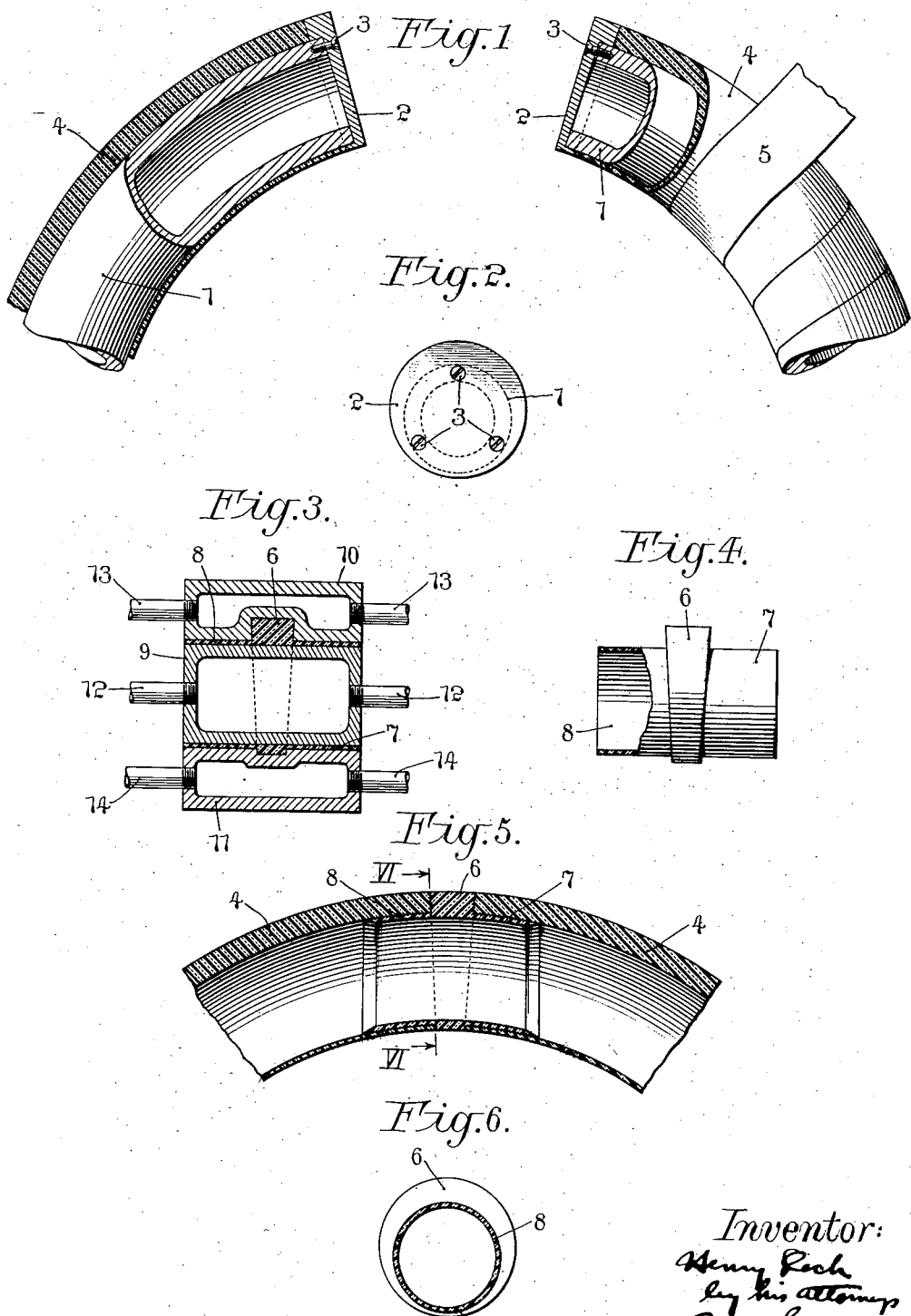

HENRY DECH, OF TRENTON, NEW JERSEY, ASSIGNOR TO MERCER TIRE COMPANY, OF TRENTON, NEW JERSEY, A CORPORATION OF NEW JERSEY.

METHOD OF MAKING INNER TUBES.

1,354,174.   Specification of Letters Patent.   Patented Sept. 28, 1920.

Application filed April 12, 1917. Serial No. 161,619.

*To all whom it may concern:*

Be it known that I, HENRY DECH, a citizen of the United States, and resident of Trenton, in the county of Mercer and State of New Jersey, have invented a new and useful Improvement in Methods of Making Inner Tubes, of which the following is a specification.

This invention relates to a method for the manufacture of rubber inner tubes of pneumatic vehicle tires, with the particular object of providing a method of making such tubes which have any desired reinforcement or thickness as to the tread portion or outer periphery thereof.

Another object consists in providing a method whereby tubes of such character may be expeditiously manufactured, and the material of which the tube is composed vulcanized in substantially the same shape as that in which it is to be used.

Up to the present time, it has been the general custom to manufacture inner tubes for pneumatic vehicle tires on either straight or spiral cores or mandrels. The straight form has been in more common use and it is referred to in the industry as a "pole." The tubes, after they have been formed on straight or spiral tubes or mandrels, are, as is well understood, subjected to heat for the purpose of vulcanization.

These tubes are commonly very thin and of a uniform thickness throughout. They are provided with a valve on the inner circumference. All this is well known in the industry. These inner tubes serve as airtight containers for the air which gives the tire its pneumatic character, and their rupture, either by direct puncture or abrasion, results in the deflation of the tire as a whole. It has been found that one of the most frequent causes of deflation is the cracking or breaking of the fabric which constitutes the inside of the outer tire shoe or casing, which cracking or breaking raises a ridge which gradually chafes through the comparatively thin inner tube.

Furthermore, any small, sharp article which penetrates the outer shoe or casing of the tire, rapidly wears through the ordinary tube; and if even a very small hole is formed in the casing, the air pressure within the tire will force the wall of the inner tube therethrough and burst it.

To obviate these disadvantages, it has been suggested to either reinforce the outer portion of the tube with metal, fabric, etc., or to make that portion of the tube relatively thick; but these suggestions have been found incapable of practical adoption when the tubes have been made on the straight or spiral mandrels and by the methods in common use.

My invention overcomes these difficulties, and enables the rapid and satisfactory manufacture of inner tubes which have their tread portions thickened or otherwise reinforced to any desired and practically useful extent.

A practical embodiment of one form of apparatus which is adapted for carrying out my improved method is shown in the accompanying drawings, in which—

Figure 1 represents a fragmentary side elevation, partly broken away, of a portion of core or mandrel adapted for the vulcanization of the major part of the tube; the tube being shown in position thereon, Fig. 2 represents a detail end view of the mandrel, Fig. 3 represents a detail section through a form of closed mold for manufacturing the small section of tube which is united with the larger portion to complete the same, Fig. 4 represents a side elevation partly broken away of the said small section of tube, Fig. 5 represents a detail section through the united ends of the tube and small section thereof, and Fig. 6 represents a detail section taken in the plane of the line VI—VI of Fig. 5, looking in the direction of the arrows.

The core for forming the major part of the tube is denoted by 1, and it takes the form of an almost complete circle. It is round in cross section, as clearly shown in Fig. 2, and its adjacent ends are provided with plates 2 which are secured to the core by suitable means, such as screws 3. These plates 2 are cupped out so as to fit over the ends of the core or mandrel 1, and extend radially therefrom to constitute a circular abutment, as clearly shown in Fig. 1. This abutment, it will be noticed, is very much thicker at the outer periphery of the core 1 than at the inner periphery thereof, and its thickness or height is graduated between the two said points, as plainly represented in Fig. 2. The plates 2 are intended to be of the same diameter as the exterior diameter of the tube to be manufactured on the mandrel 1.

In carrying out my improved method, the major part of the tube, which is denoted by 4, is built up on the mandrel 1, and during this step a suitable valve may be built in. The said part of the tube is then wound spirally with fabric or tape 5 and submitted to vulcanization.

The manner of building (including the insertion of the valve), wrapping and vulcanizing the part 4 of the tube will be perfectly plain to any operative in this industry without further description.

After this part of the tube has been vulcanized, the tape 5 is removed and the said portion of the tube stripped off from the core or mandrel 1.

I next provide a small section of tube which is preferably of the form shown in Figs. 3 and 4, i. e., it consists of a wedge-shaped circular body portion 6 and two laterally extending sleeves 7, 8. This small section may be made of the same rubber composition as the major portion of the tube 4 and be vulcanized in a suitable closed mold, such as that represented in Fig. 3. The core member of the closed mold is indicated by 9 and the outer member by 10 and 11. This outer member may be in two or more parts to suit the taste of the manufacturer.

Suitable pipes 12, 12, 13, 13, and 14, 14, may be provided for the ingress and egress of a heating medium to and from the mold members. As such a mold is of conventional form and thoroughly understood in the art, it is not deemed necessary to show or describe it in further detail.

After the small section 6, 7, 8, has been vulcanized, it is removed from its mold, and the exterior surfaces of the sleeves 7 and 8 and the side faces of the body portion 6 coated with a suitable vulcanizing cement. The cement is permitted to become "tacky," and then the small section 6, 7, 8, is assembled in abutting engagement with the ends of the major part of the tube 4, as clearly illustrated in Fig. 5. If desired, those portions of the part 4 of the tube which are to be engaged by the small section 6, 7, 8, may also be suitably cemented before the assembling of the said parts.

The united tube may now be inflated through its valve, to a pressure of say about ten pounds, and submitted to vulcanizing heat, for a short period, for the purpose of curing the cement intermediate the part 4 and the small section 6, 7, 8.

After this operation, the tube is completed and may be disposed or utilized in the ordinary manner.

It will be observed that by the above method, the tube is completely built and vulcanized in substantially the same shape in which it is to be used and that the uniting of the ends thereof does not require appreciable distortion or telescoping of the thickened parts.

I desire it to be understood that various changes may be resorted to in the form, construction and arrangement of the apparatus used in carrying out the method and in the particular manner of conducting the steps of the method and in the order thereof, without departing from the spirit and scope of my invention; and hence I do not intend to be limited to the details herein shown and described except as they are specifically included in the claims.

What I claim is:—

1. The method of making an inner tube comprising, first, building the major part of the tube on a curved mandrel; second, vulcanizing the said part; third, removing it from the mandrel; fourth, placing a section of similar tubular form and having laterally extending sleeves between and abutting the ends of the said part with the sleeves projecting within the said part; and, finally, vulcanizing the ends and section together.

2. The method of making an inner tube comprising, first, building the major part of the tube on a curved mandrel; second, vulcanizing the said part; third, removing it from the mandrel; fourth, forming a section of similar material and similar tubular form and having laterally extending sleeves; fifth, vulcanizing said section; sixth, coating said section with cement; seventh, placing the said section between and abutting the ends of the said part with the sleeves projecting within the said part; and, finally, vulcanizing the ends and section together.

3. The method of making an inner tube comprising, first, building the major part of the tube on a curved mandrel; second, vulcanizing the said part; third, removing it from the mandrel; fourth, forming a wedge-shaped section of similar material and similar tubular form and having laterally extending sleeves; fifth, vulcanizing the said section; sixth, placing the said section between the ends of the said parts with the sleeves projecting within the said part; and, finally, vulcanizing the ends and section together.

4. The method of making an inner tube comprising, first, building the major part of the tube on a curved mandrel; second, vulcanizing the said part; third, removing it from the mandrel; fourth, forming a wedge-shaped section of similar material and similar tubular form and having laterally extending sleeves; fifth, vulcanizing said section; sixth, coating said section with cement; seventh, placing the said section between the ends of the said part with the sleeves projecting within the said part; and, finally, vulcanizing the ends and section together.

In testimony that I claim the foregoing as my invention, I have signed my name this 27th day of March, 1917.

HENRY DECH.